United States Patent
Sakuda et al.

(10) Patent No.: US 9,002,271 B2
(45) Date of Patent: Apr. 7, 2015

(54) INFORMATION PROCESSING DEVICE, INFORMATION PROCESSING SYSTEM, AND METHOD OF CONTROLLING INFORMATION PROCESSING DEVICE

(75) Inventors: Kenji Sakuda, Suwa (JP); Yoshinao Kitahara, Suwa (JP)

(73) Assignee: Seiko Epson Corporation, Tokyo (JP)

(*) Notice: Subject to any disclaimer, the term of this patent is extended or adjusted under 35 U.S.C. 154(b) by 638 days.

(21) Appl. No.: 12/646,687

(22) Filed: Dec. 23, 2009

(65) Prior Publication Data

US 2010/0167651 A1 Jul. 1, 2010

(30) Foreign Application Priority Data

Dec. 26, 2008 (JP) ................................. 2008-332604

(51) Int. Cl.
*H04B 7/00* (2006.01)
*H04W 76/06* (2009.01)

(52) U.S. Cl.
CPC .................................. *H04W 76/066* (2013.01)

(58) Field of Classification Search
CPC ...... G08G 5/065; G05D 1/0055; G06F 17/40; G06F 1/1613; G06F 13/12; G06F 13/00; G06F 13/14; H04W 8/005; H04W 88/06; H04B 7/00
USPC ........ 710/300, 305, 306, 315; 455/41.1, 41.2, 455/445, 41.3; 126/300, 305, 306, 315; 358/1.15, 1.13, 1.14
See application file for complete search history.

(56) References Cited

U.S. PATENT DOCUMENTS

| | | | | |
|---|---|---|---|---|
| 7,573,592 B2* | 8/2009 | Hirai et al. | ................... | 358/1.15 |
| 7,577,111 B2* | 8/2009 | Yeung et al. | ................... | 370/310 |
| 7,634,670 B2* | 12/2009 | Nago et al. | .................... | 713/300 |
| 7,924,449 B2* | 4/2011 | Maki | .......................... | 358/1.15 |
| 8,154,603 B2* | 4/2012 | Shioji | ........................ | 348/207.1 |
| 8,224,969 B2* | 7/2012 | Nampei | ....................... | 709/227 |
| 8,396,424 B2* | 3/2013 | Frazier et al. | ................ | 455/41.2 |
| 8,531,533 B2* | 9/2013 | Yokota | ........................ | 348/207.2 |
| 8,665,474 B2* | 3/2014 | Kato | ............................. | 358/1.15 |
| 2003/0172304 A1* | 9/2003 | Henry et al. | ................... | 713/201 |
| 2005/0113025 A1* | 5/2005 | Akamatsu et al. | ........... | 455/41.3 |
| 2006/0065743 A1* | 3/2006 | Fruhauf | ........................ | 235/492 |

(Continued)

FOREIGN PATENT DOCUMENTS

JP 2006-268845 A 10/2006

*Primary Examiner* — Wesley Kim
*Assistant Examiner* — MD Talukder
(74) *Attorney, Agent, or Firm* — Kilpatrick Townsend & Stockton LLP (57) ABSTRACT

An information processing device is provided, which includes: a first wireless unit capable of wirelessly transmitting and receiving data; a second wireless unit capable of wirelessly transmitting and receiving data; a data processing unit which executes processing of data input from at least one of the first wireless unit and the second wireless unit; and a control unit that, when any one of the first wireless unit and the second wireless unit is connected with an electronic equipment, connection is requested from an electronic equipment which is not connected in accordance with the execution of the data processing, and the data processing is not executed by the electronic equipment which is connected, releases the connection with the electronic equipment which is connected and executes connection of any one of the first wireless unit and the second wireless unit with the electronic equipment which has requested the connection.

11 Claims, 5 Drawing Sheets

(56) References Cited

U.S. PATENT DOCUMENTS

| | | |
|---|---|---|
| 2006/0072152 A1* | 4/2006 | Krykun et al. ............... 358/1.15 |
| 2006/0087691 A1* | 4/2006 | Matsugashita ............... 358/1.15 |
| 2006/0104238 A1* | 5/2006 | Hibino ......................... 370/328 |
| 2006/0119883 A1* | 6/2006 | Lovat et al. .................. 358/1.15 |
| 2006/0195552 A1* | 8/2006 | Nampei ........................ 709/218 |
| 2006/0242304 A1* | 10/2006 | Hirose et al. ................. 709/227 |
| 2007/0275683 A1* | 11/2007 | Songer et al. ............. 455/185.1 |
| 2007/0283075 A1* | 12/2007 | Patton .......................... 710/315 |
| 2007/0288680 A1* | 12/2007 | Tominaga et al. ........... 710/313 |
| 2008/0002233 A1* | 1/2008 | Higuchi et al. .............. 358/403 |
| 2008/0024815 A1* | 1/2008 | Oak ............................ 358/1.15 |
| 2008/0130553 A1* | 6/2008 | Takahashi .................... 370/328 |
| 2008/0205315 A1* | 8/2008 | Park et al. .................... 370/310 |
| 2009/0144467 A1* | 6/2009 | Suzuki ........................... 710/40 |
| 2010/0031250 A1* | 2/2010 | Hasegawa .................... 717/174 |
| 2010/0069006 A1* | 3/2010 | Baek ............................ 455/41.3 |
| 2010/0141989 A1* | 6/2010 | Kitahara et al. ............ 358/1.15 |
| 2010/0153595 A1* | 6/2010 | Sakuda et al. ................. 710/63 |
| 2010/0167651 A1* | 7/2010 | Sakuda et al. ............... 455/41.2 |
| 2010/0214611 A1* | 8/2010 | Watanabe .................... 358/1.15 |
| 2010/0268801 A1* | 10/2010 | Yukimasa .................... 709/220 |
| 2011/0194147 A1* | 8/2011 | Kato ............................ 358/1.15 |
| 2011/0208942 A1* | 8/2011 | Okutsu ......................... 711/170 |
| 2014/0022576 A1* | 1/2014 | Shima et al. ................. 358/1.13 |

\* cited by examiner

INFORMATION PROCESSING DEVICE, INFORMATION PROCESSING SYSTEM, AND METHOD OF CONTROLLING INFORMATION PROCESSING DEVICE

CROSS-REFERENCES TO RELATED APPLICATIONS

This application claims priority under 35 U.S.C. §119 to Japanese Patent Application No. 2008-332604, filed Dec. 26, 2008, the entire disclosure of which is expressly incorporated by reference herein.

BACKGROUND

1. Technical Field

The present invention relates to an information processing device, an information processing system, and a method of controlling the information processing device.

2. Related Art

It becomes possible to easily switch connection between equipments with no involvement of a cable connection or a connection change by connecting a plurality of equipments in wireless communication. For example, JP-A-2006-268845 describes switching of a connection by a user becoming easier by performing a display of the availability of connection with each host device in peripheral equipments in wirelessly connecting with a plurality of host devices.

However, with the peripheral device as described in JP-A-2006-268845, there has been a problem that after selecting any one of a plurality of host devices, the correspondent host device takes sole possession of the peripheral device, and other host devices cannot use the peripheral device even when this host device is not using it, and therefore that the peripheral device cannot be made more use of by a plurality of host devices.

SUMMARY

An advantage of some aspects of the invention is that it provides an information processing device, an information processing system, and a method of controlling the information processing device, which make it possible to increase throughput of data received from an electronic equipment as much as possible.

According to a first aspect of the invention, provided is an information processing device including: a first wireless USB unit capable of wirelessly transmitting and receiving data; a second wireless USB unit capable of wirelessly transmitting and receiving data; a data processing unit which executes processing of data input from at least one of the first wireless USB unit and the second wireless USB unit; and a control unit that, when any one of the first wireless USB unit and the second wireless USB unit is connected with an electronic equipment, connection is requested from an electronic equipment which is not connected in accordance with the execution of the data processing, and the data processing is not executed by the electronic equipment which is connected, releases the connection with the electronic equipment which is connected and executes connection of any one of the first wireless USB unit and the second wireless USB unit with the electronic equipment which has requested the connection.

In the information processing device, when any one of the first wireless USB unit and the second wireless USB unit is connected with an electronic equipment, connection is requested from an electronic equipment which is not connected in accordance with the execution of the data processing, and the data processing is not executed by the electronic equipment which is connected, the device releases the connection with the electronic equipment which is connected and executes connection of any one of the first wireless USB unit and the second wireless USB unit with the electronic equipment which has requested the connection. That is to say, when the data processing is not being executed, the information processing device is so constituted as to preferentially connect with the electronic equipment which attempts to execute the data processing, to release the connection with the electronic equipment which is not executing the data processing, and to open at least one switching wireless USB unit. For this reason, it is possible to prevent the equipment which is not executing the data processing from taking sole possession of the data processing unit. Therefore, it is possible to increase the throughput of data received from the electronic equipment.

It is preferable that in the information processing device, the control unit transmits an execution state of the data processing unit to an electronic equipment which has requested connection after the connection is requested from the electronic equipment that is not connected when any one of the first wireless USB unit and the second wireless USB unit is connected with an electronic equipment, and raises connection priority of the electronic equipment which has requested the connection when a connection release command is received from the electronic equipment which has requested the connection, and then releases the connection with the electronic equipment which is connected and the connection with the electronic equipment which has requested the connection, and also executes reconnection with the electronic equipment having high connection priority. With this configuration, it is possible to preferentially connect the equipment which attempts to execute the data processing on the basis of the request from the electronic equipment side.

It is preferable that in the information processing device, when an electronic equipment is connected to the first wireless USB unit, connection is requested from an electronic equipment which is not connected via the second wireless USB unit to execute the data processing, and the data processing is not executed by the electronic equipment which is connected, the control unit releases the connection with the electronic equipment connected to the first wireless USB unit, and also executes the connection of the first wireless USB unit with the electronic equipment which has requested the connection. With this configuration, it is possible that the first wireless USB unit is specialized for transmission and reception of data on processing data, and that the second wireless USB unit is specialized for transmission and reception for the switching of the electronic equipment.

It is preferable that in the information processing device, the data processing unit serves as one or more of a print processing unit that prints image data to a print medium, an image reading processing unit that reads a document medium to generate image data, and a data storage processing unit that stores data in a storage medium. The print processing, the image reading processing, and the data storage processing are executed via the USB connection in many instances, therefore the application of the invention is of great significance.

It is preferable that in the information processing device, when a lock command has been received at the time of the connection request from the electronic equipment, the control unit makes connection with the electronic equipment in a lock state where connection is not released by a connection request from other electronic equipment. With this configuration, it is possible to secure the sustained data processing.

According to a second aspect of the invention, provided is an information processing system including the information processing device described above which is capable of executing the data processing, and an electronic equipment including a transmission control unit that transmits a connection request to the information processing device at the time of executing the data processing. Since this data processing system includes the information processing device described above, the data processing system exerts the same effects as those of the information processing device described above, for example, an effect that the throughput of data received from the electronic equipment can possibly be increased and the like.

This information processing system includes the information processing device described above that is capable of executing the data processing and receives a connection release command, and an electronic equipment including the transmission control unit that transmits a connection request to the information processing device at the time of executing data processing, and then receives an execution state of the data processing unit from the information processing device, and when the received execution state is a state where the data processing is not executed, transmits a command for raising self-connection priority and a connection release command for releasing the connection with the electronic equipment which is connected, to the information processing device. Since this information processing system includes the information processing device described above, the information processing system exerts the effects of the information processing device described above, for example, an effect that the throughput of data received from the electronic equipment can possibly be increased, or an effect that the equipment attempting to execute the data processing on the basis of the request from the electronic equipment side can be preferentially connected.

According to a third aspect of the invention, provided is a method of controlling the information processing device including a first wireless USB unit capable of wirelessly transmitting and receiving data, a second wireless USB unit capable of wirelessly transmitting and receiving data, and a data processing unit that executes processing of data input from at least one of the first wireless USB unit and the second wireless USB unit, the method including: when any one of the first wireless USB unit and the second wireless USB unit is connected with an electronic equipment, connection is requested from an electronic equipment which is not connected in accordance with the execution of the data processing, and the data processing is not executed by the electronic equipment which is connected, releasing the connection with the electronic equipment which is connected and executing connection of any one of the first wireless USB unit and the second wireless USB unit with the electronic equipment which has requested the connection.

Similarly to that of the information processing device described above, when data processing is not being executed, this method of controlling the information processing device is so constituted as to preferentially connect with the electronic equipment which attempts to execute the data processing, to release the connection with the electronic equipment which is not executing the data process, and to open at least one switching wireless USB unit. For this reason, it is possible to prevent the equipment which is not executing the data processing from taking sole possession of the data processing unit. Therefore, it is possible to increase the throughput of data received from the electronic equipment. Meanwhile, in the method of controlling this information processing device, a variety of embodiments of the information processing device described above may be adopted. In addition, steps for implementing each function of the information processing device described above may be added.

The program according to another aspect of the invention is to implement each step of the control method of the information processing device described above to one or a plurality of computers. This program may be recorded on a recording medium that is readable by a computer (for example hard disk, ROM, FD, CD, DVD and the like), and may be delivered from one computer to another computer through a transmission medium (communication network such as Internet, LAN and the like), and also may be sent and received in any other form. If this program is executed on one computer, or on a plurality of computers with each step shared, each step of the control method of the information processing device described above is executed, to thereby obtain similar effects to those of the control method.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
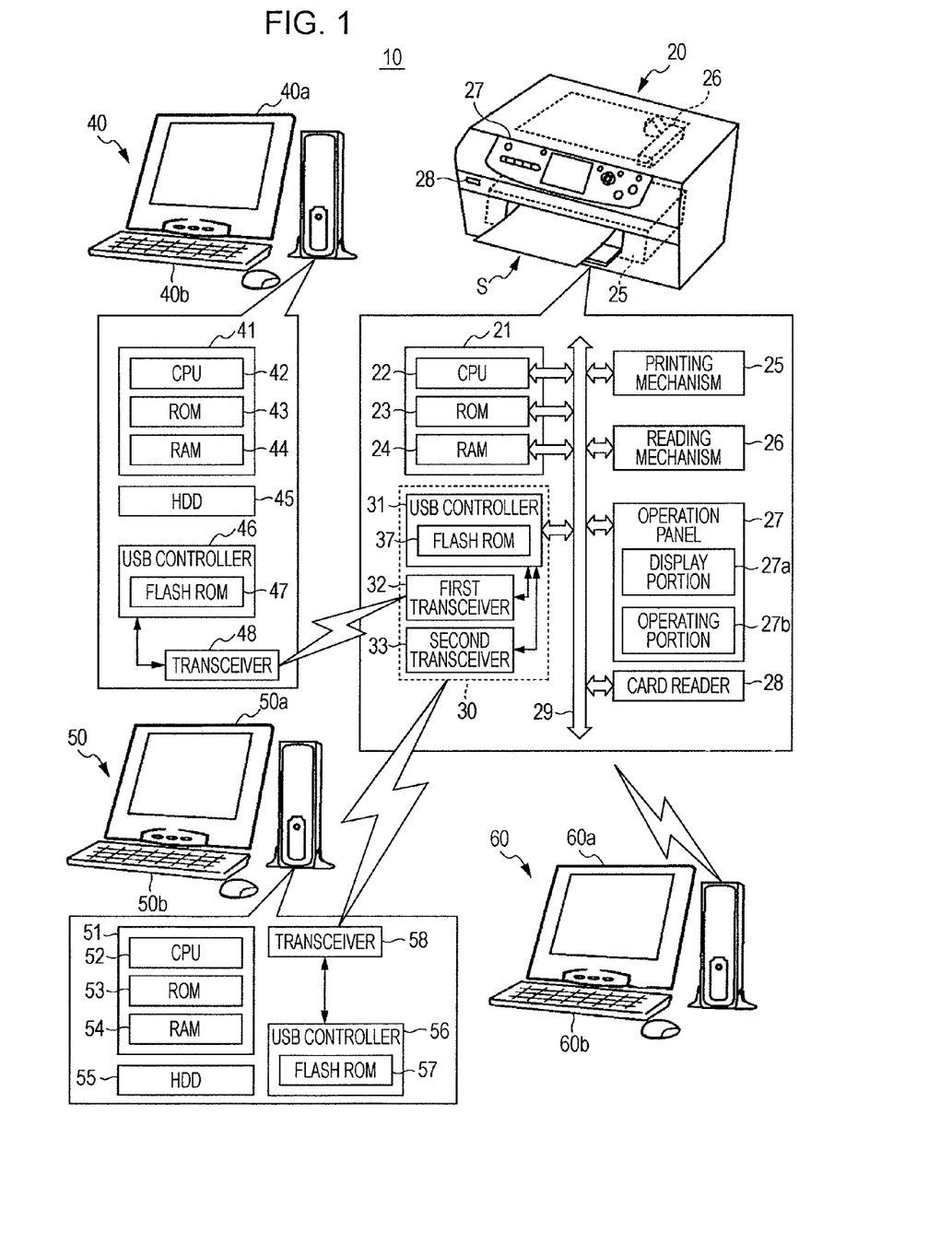
FIG. 1 is a configuration diagram schematically showing a wireless USB system.
Figure 2:
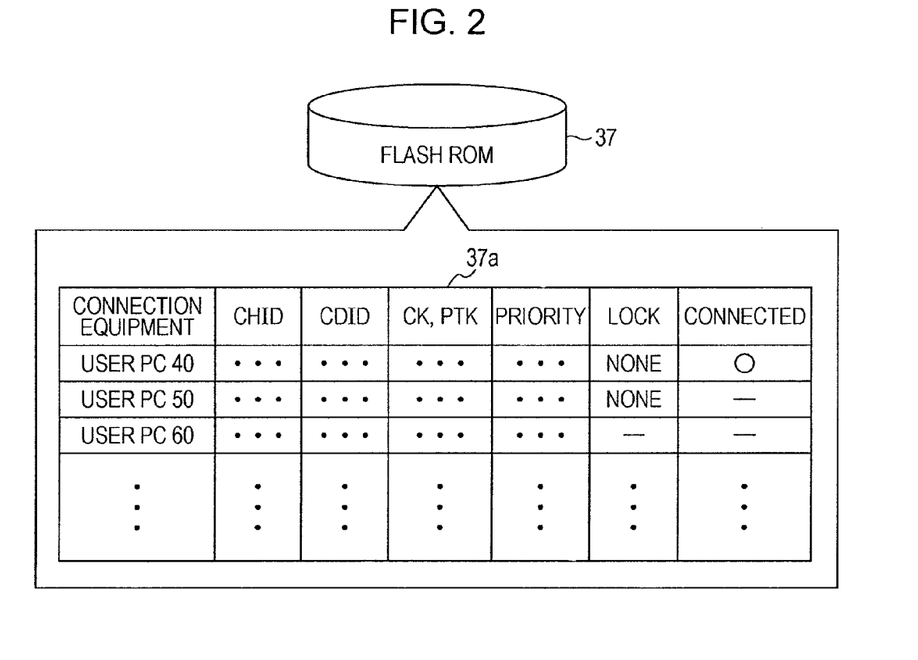
FIG. 2 is an explanatory diagram of connection setup information stored in a flash ROM.

Next, the best mode for carrying out the invention will be described with reference to the drawings. FIG. 1 is a configuration diagram schematically showing the configuration of a wireless USB system 10 which is an embodiment of the invention. FIG. 2 is an explanatory diagram of connection setup information 37a stored in a flash ROM 37. As shown in FIG. 1, the wireless USB system 10 of the embodiment is constituted by a multifunctional printer 20 capable of executing print processing, image reading processing and data storage processing, and user personal computers (PC) 40, 50 and 60 which perform the exchange of information with the printer 20 via the wireless USB as USB hosts. Meanwhile, the wireless USB system 10 of the embodiment has one printer 20 and three user PCs, but the system may be constituted by an arbitrary number thereof.

The printer 20 includes a controller 21 taking charge of the control of the whole apparatus, a printing mechanism 25 performing the printing on a recording paper S using ink as a colorant, a reading mechanism 26 optically reading a document to generate image data, an operation panel 27 having a display portion 27a capable of displaying information to a user and an operating portion 27b capable of inputting instructions from the user, a card reader 28 having a memory card which is a portable storage medium mounted therein and executing the reading of data, and a USB device 30 performing wireless transmission and reception of data to and from an electronic equipment (for example user PC 40). The controller 21 is constituted by a microprocessor centering on a CPU 22, and includes a ROM 23 having various types of processing programs stored therein and a RAM 24 in which data are stored temporarily. This controller 21 is connected with the printing mechanism 25 or the reading mechanism 26, the operation panel 27, the card reader 28, the USB device 30 and the like via a bus 29. The printing mechanism 25, not shown, is an ink jet type mechanism in which pressure is put upon each color of ink, and the pressurized ink is discharged on a recording paper S, to thereby execute the print processing. Meanwhile, the mechanism in which pressure is put upon ink may be not only a mechanism operating by transformation of a piezoelectric element, but also a mechanism operating by generation of bubbles due to the heat of a heater. The reading mechanism 26 is a so-called flatbed type, and is a mechanism which reads an image formed on the document as data by the scanning of a reading sensor which resolves a reflected light, obtained by applying a light to the document placed on a glass surface, into each color and inputs it. The card reader 28, with a memory card which is a portable storage medium being mounted in a slot (not shown), writes image data read by the reading mechanism 26 or data input from the user PC 40 and the like in the memory card, and reads the data stored in the memory card.

The USB device 30 includes a USB controller 31 controlling the exchange of information with wirelessly connected external equipment, a first transceiver 32 capable of wirelessly transmitting and receiving information to and from the external equipment, a second transceiver 33 provided separately from the first transceiver 32, and a flash ROM 37 capable of storing and erasing information. The transceivers 32 and 33 are wireless interfaces used chiefly for transmitting and receiving information when the USB device 30 functions as a USB device. As shown in FIG. 2, connection setup information 37*a* used when the wireless USB connection is performed is stored in the flash ROM 37. In this connection setup information 37*a*, there are stored not only connection and context information (hereinafter, CC information) including CHID (Connection Host ID) which is a unique ID of the USB host (here, personal computer 40, etc.), CDID (Connection Device ID) which is a unique ID of the USB device (here, printer 20) and CK (Connection Key) which is a master key shared to both or the like, but also PTK (Pairwise Temporal Key) generated by CK, connection priority, the presence or absence of the lock by which connection release is not performed, and information on whether to be currently connected or the like.

The user PC 40 is a well-known general-purpose personal computer, and includes a controller 41 composed of a CPU 42 executing various types of controls, a ROM 43 having various types of control programs stored therein, and a RAM 44 in which data is temporarily stored or the like; an HDD 45 that is a large-capacity memory in which various types of application programs or various types of data files are stored; and a USB controller 46 performing wireless transmission and reception of data to and from the external equipment (for example printer 20). The USB controller 46 is provided with a flash ROM 47 having information and the like used in transmitting and receiving data stored therein. A transceiver 48 and the like executing wireless transmission and reception of data as a USB host is electrically connected to the USB controller 46. In addition, the user PC 40 includes a display 40*a* displaying various types of information on the screen or input devices 40*b* such as a keyboard and a mouse through which a user inputs various types of commands. When the user performs an input operation on a cursor and the like displayed on the display 40*a* through the input devices 40*b*, the user PC 40 has a function for executing an action in accordance with the input operation. This user PC 40 commands the printer 20 to execute the print processing via an installed program, and commands the printer 20 to execute the reading processing of an image. A user PC 50 has the same components as the user PC 40, and includes a controller 51 composed of a CPU 52, a ROM 53, a RAM 54 and the like; a HDD 55; a USB controller 56; a display 50*a*; and an input device 50*b*. Similarly, the USB controller 56 includes a flash ROM 57 and a transceiver 58. Since these are the same components as those of the user PC 40, the descriptions thereof are omitted. Further, a user PC 60 includes the same components as those of the user PC 40, which are not shown, in addition to a display 60*a* or an input device 60*b* and the like.

Here, wireless USB communication will be described. In the wireless USB, wireless communication is performed between a host (for example, user PC 40) and a device (for example, printer 20). In order for this host and device to perform the wireless USB communication, first of all, it is necessary to share beforehand the CC information in accordance with a communication destination with each other. Information required for performing communication, for example, IDs unique to the host and the device for communicating with each other, or connection keys (CK) are included in the CC information. Methods of sharing this CC information include a USB cable method (Out of Band method) of connecting each other via a USB cable to share the CC information, and a numeric method (In Band method) of sharing the CC information in wireless communication by UWB. Between the host and the device sharing the CC information with each other, it is possible to initiate secure communication by confirming that the identical connection key is shared with each other by 4-way handshake and establishing the connection. Here, the USB hosts (user PC 40, 50, 60) and the USB device (printer 20) required for establishing the connection are presumed to have previously completed the sharing of the CC information. As shown in FIG. 2, priority is given to the connection setup information 37*a* including the CC information. When capable of communicating with the host corresponding to the CC information having the highest priority, the printer 20 performs establishing connection with the host as a priority. This printer 20 is configured potentially to establish the connection of the first transceiver 32, but to be set up not potentially to establish the wireless USB connection in the second transceiver 33 in order to receive the connection request from the other USB host. The first transceiver 32 and the second transceiver 33 are configured to maintain an idling state when the connection with the USB host has been established, and to be capable of performing immediate transmission and reception of information as necessary.

Figure 3:
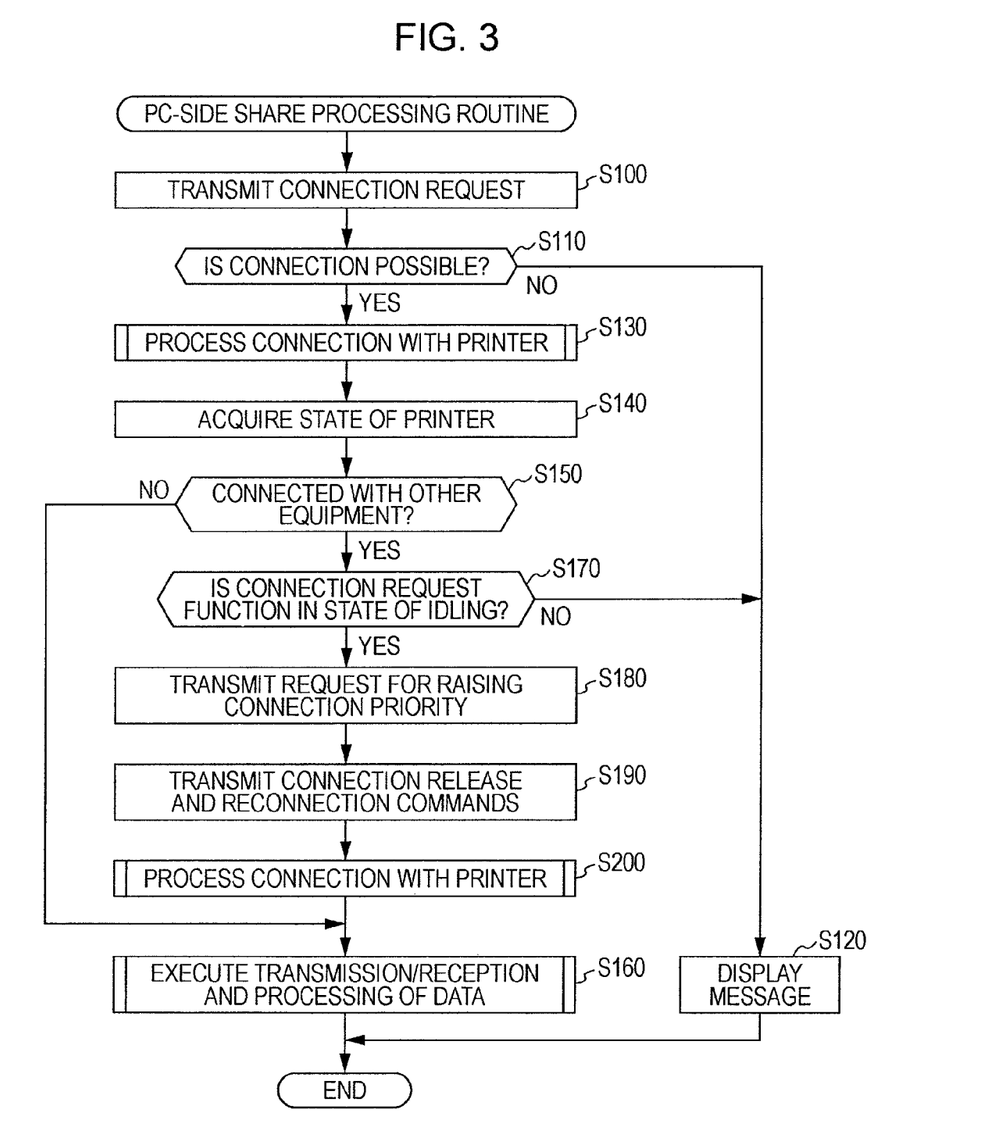
FIG. 3 is a flowchart showing an example of PC-side share processing routine.
Figure 4:
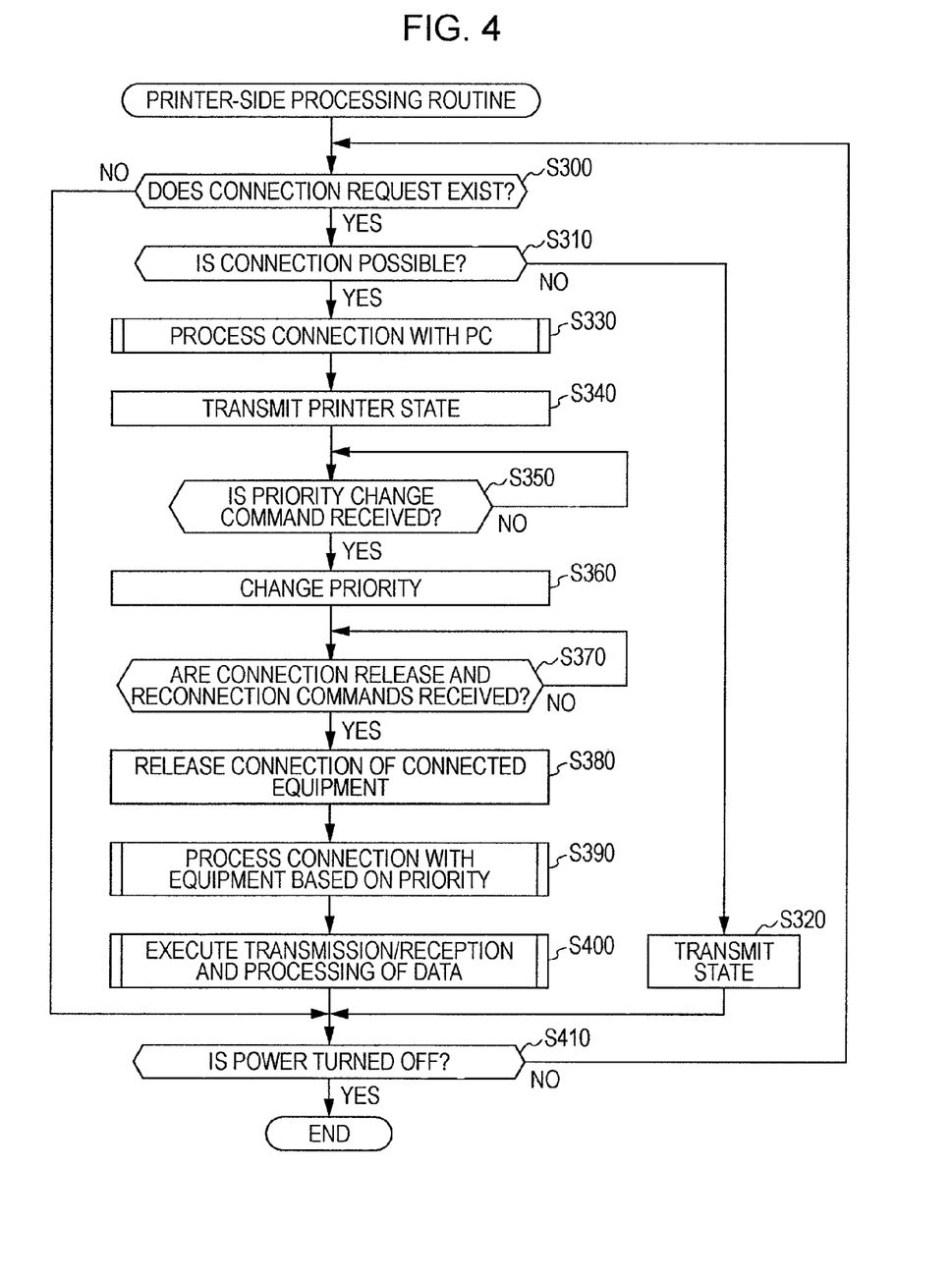
FIG. 4 is a flowchart showing an example of printer-side processing routine.

Next, an operation of the wireless USB system 10 of the embodiment constituted in such a manner, particularly, an operation for performing the processing of data in a state of being connected to the printer 20 will be described. FIG. 3 is a flowchart illustrating an example of a PC-side share processing routine executed by the CPU 52 of the user PC 50. FIG. 4 is a flowchart illustrating an example of a printer-side processing routine executed by the CPU 22 of the printer 20. Here, description of a case where the connection of the user PC is switched will be made. However, for convenience of description, a case will be described as a specific example where the user PC 40 is connected by wireless USB to the first transceiver 32 of the printer 20, and the user PC 50, which is not being connected, is connected by wireless USB to the printer 20 to allow the printing mechanism 25 to execute the print processing. Meanwhile, the PC-side share processing routine is also stored in the HDD 45 of the user PC 40, and the same is stored in the HDD 55 of the user PC 50 or that of the user PC 60 as well.

The PC-side share processing routine shown in FIG. 3 is stored in the HDD 55, and is executed by the CPU 52 after execution of the print processing has been instructed by a user. This routine is executed using the USB controller 56 or the flash ROM 57 by the CPU 52. When this routine is executed, first of all the CPU 52 transmits the connection request from the transceiver 58 (step S100). Here, the USB controller 56 transmits the connection request to the first transceiver 32, and transmits the connection request to the second transceiver 33 when the connection is not possible in the first transceiver 32. Next, the CPU 52 determines the capability of being connected on the basis of the content of response to the transmitted request (step S110), displays a message thereof on the display 50a (step S120), and terminates this routine. Meanwhile, in the first transceiver 32 and the second transceiver 33, one of the two is possibly opened, but for example, a case where the connection is not possible occurs when the connection to the one side is established and the other side has received the connection request.

On the other hand, when the connection is possible in step S110, the CPU 52 performs the processing of connection with the printer 20 via the transceiver 58 (step S130). For example, when the connection of the transceiver 58 and the second transceiver 33 is established, the CPU 52 acquires a state of the printer 20 (step S140), and determines whether to be connected with other electronic equipment (step S150). In step S140, the state of the printer 20 is acquired, which is information of whether to be connected with other electronic equipment, and whether it is in a state where any one of the printing mechanism 25, the reading mechanism 26 and the card reader 28 of the printer 20 executes the processing or is in an idling state. When the printer 20 is not connected with other equipment, the CPU 52 executes transmission and reception of data and allows the printer 20 to execute the print processing on the transmitted data (step S160), and terminates this routine as it is.

On the other hand, when the printer 20 is connected with other electronic equipment in step S150, the CPU 52 determines whether the configuration executing the function for which connection is requested is in a state of idling (step S170). The printing mechanism 25, the reading mechanism 26 and the card reader 28 or the like are included in the configuration executing the function for which connection is requested. Here, whether the printing mechanism 25 is in a state of idling is determined. When the configuration executing the function for which connection is requested is not in a state of idling, namely, is executing the processing, a message thereof is displayed on the display 50a (step S120), and this routine is terminated. Meanwhile, when the configuration executing the function for which connection is requested is in a state of idling, it is determined that the connected equipment (here, user PC 40) is not using the printer 20, and the CPU 52 transmits the request for raising the connection priority of the user PC 50 to the printer 20 (step S180).

Subsequently, the CPU 52 transmits the connection release command for releasing the connection with the electronic equipment which is currently connected and the reconnection command for reconnecting on the basis of the priority after the connection release, to the printer 20 (step S190). The printer 20 which has received these commands raises the connection priority of the user PC 50 to top-level, and at the same time releases the connection state and attempts to execute the reconnection processing in the order of the equipment having the top-level connection priority. The CPU 52 then executes the processing of connection with the printer 20 (step S200). At this time, since the priority of the user PC 50 is high, the user PC 50 is connected by wireless USB with the printer 20 via the first transceiver 32. In this manner, with one of the first transceiver 32 and the second transceiver 33 being opened, when the printing mechanism 25 is not used, and the electronic equipment attempting to use the printing mechanism 25 requests the connection, the connection is released to thereby allow the printing mechanism 25 to be used.

Next, the processing in the printer 20 side will be described. The printer-side processing routine shown in FIG. 4 is stored in the ROM 23, and executed by the CPU 22 after the power is turned on by a user. This routine is executed using the USB controller 31 or the flash ROM 37 by the CPU 22. When this routine is executed, first of all the CPU 22 determines whether it has received the connection request (step S300). If the connection request exists, the CPU 22 determines whether the connection is possible based on whether the first transceiver 32 and the second transceiver 33 are connected (step S310). When the connection is not possible, the state thereof is transmitted to the user PC 50 which is a source of the connection request (step S320). On the other hand, when the connection is possible in step S310, the processing of connection with the user PC 50 which has transmitted the connection request is performed (step S330), and a state of the printer 20 is transmitted to the user PC 50 (step S340). Here, the state of the printer 20 is transmitted, which is information as to whether to be connected with other electronic equipment, and whether it is in a state where any of the printing mechanism 25, the reading mechanism 26 and card reader 28 of the printer 20 executes the processing or is in an idling state.

Next, the CPU 22 determines whether it has received a command to change the priority (step S350). When the command to change the priority is not received the CPU 22 waits as it is, and when the command to change the priority has been received, the CPU 22 executes the processing of changing the priority on the basis of the received information (step S360). Here, information about the priority stored in the connection setup information 37a is rewritten. Next, the CPU 22 determines whether it has received the connection release and the reconnection command (step S370). When the connection release and the reconnection command have not been received the CPU 22 waits as it is, and when the connection release and the reconnection command have been received the CPU 22 performs the processing for releasing the connection of the connected electronic equipment (step S380). Subsequently, the CPU 22 executes the connection in the order from other electronic equipment having a high priority stored in the connection setup information 37a (step S390). Here, since the priority of the user PC 50 which requested the connection is top level, the USB controller 31 preferentially executes the connection of the first transceiver 32 and the transceiver 58. Meanwhile, when the wireless USB connection in the first transceiver 32 is established, the processing of establishing the wireless USB connection in the second transceiver 33 side is not performed. Therefore, the first transceiver 32 side is connected by wireless USB for data communication, and the second transceiver 33 side is connected by wireless USB for switching the connection destination.

Subsequently, the CPU 22 executes transmission and reception processing of data to and from the connected user PC 50, and executes the requested processing (step S400). Here, the print processing is executed in the printing mechanism 25 using data received from the user PC 50. Here, while the print processing transports the recording paper S from a paper feed position, processing is executed where ink is discharged to the recording paper S on which an image is formed on the basis of print data received from the user PC 50.

After the processing is terminated in step S400, or after the connection request is made in step S300, or after a state where the connection is not possible is transmitted in step S320, the CPU 22 determines whether the power is turned off (step S410). When the power is not turned off, the CPU 22 executes the processes subsequent to step S300. When the power is turned off the CPU 22 terminates this routine as it is. Here, for example, when the first transceiver 32 is connected by wireless USB with the user PC 40, and the second transceiver 33 is connected by wireless USB with the user PC 60, it is not possible for the user PC 50 to use the function of the printer 20 even if the user PCs 40 and 60 are not jointly using the function of the printer 20. This wireless USB system 10 opens at least one of the first transceiver 32 and the second transceiver 33, so that the system is configured to allow the equipment which attempts to use the function of the printer 20 to be preferentially connected.

Here, the correspondence relationship of components of the embodiment and components of the invention are clarified. The printer 20 of the embodiment is equivalent to the information processing device, the user PCs 40, 50 and 60 are equivalent to the electronic equipment, and the wireless USB system 10 is equivalent to the information processing system. In addition, the first transceiver 32 is equivalent to the first wireless USB unit of the invention, the second transceiver 33 is equivalent to the second wireless USB unit, the printing mechanism 25, the reading mechanism 26 and the card reader 28 are equivalent to the data processing unit, the CPU 22 and the USB controller 31 are equivalent to the control unit, the CPU 52 and the USB controller 56 are equivalent to the transmission control unit, and the recording paper S is equivalent to the print medium. Further, in the embodiment, an example of the method of controlling the information processing device according to the invention is also clarified by describing an operation of the wireless USB system 10.

According to the wireless USB system 10 of the embodiment described above, when at least one of the first transceiver 32 and the second transceiver 33 is connected with the electronic equipment (user PC 40), the connection is requested from the electronic equipment (user PC 50) which is not connected in accordance with the execution of the print processing, and the print processing is not executed by the electronic equipment which is connected, the system releases the connection with the electronic equipment which is connected, and executes the connection of at least one of the first transceiver 32 and the second transceiver 33 with the electronic equipment which has requested the connection. In other words, when the print processing is not being executed, the system is configured to connect with the electronic equipment which attempts to execute the print processing, release the connection with the electronic equipment which is not executing the print processing, and opens at least one of the switching wireless USB transceivers. For this reason, it is possible to prevent the equipment which is not executing the print processing from taking sole possession of the printing mechanism 25. Therefore, it is possible to increase the throughput of data received from the electronic equipment. In addition, since the system raises the connection priority of the electronic equipment which has requested the connection, and then releases the connection with the electronic equipment which is connected and the connection with the electronic equipment which has requested the connection, and also executes reconnection with the electronic equipment having high connection priority, the system can preferentially connect the equipment which attempts to execute the print processing on the basis of the request from the electronic equipment side. Further, since the first transceiver 32 side is connected by wireless USB for data communication, and the second transceiver 33 side is connected by wireless USB for switching the connection destination, the first transceiver 32 can be specialized for transmission and reception of data on processing data, and the second transceiver 33 can be specialized for transmission and reception for switching the electronic equipment. For this reason, since the connection switching transceiver does not perform large-capacity communication, for example, it is possible to use the transceiver having low performance. Furthermore, since the connection request from the user PC 50 is in accordance with the print processing of the printing mechanism 25, the image reading processing of the reading mechanism 26 and the data storage processing of the card reader 28, and the printing mechanism 25, the reading mechanism 26 and the card reader 28 execute the processes via the USB connection in many instances, the application of the invention is of great significance. Meanwhile, since the wireless USB connection is not a physical connection, for example, it is possible to preferentially connect with the electronic equipment which attempts to execute the data processing without requiring a user operation such as insertion or extraction of a cable in wire USB, and it is easy to increase the throughput of data received from the electronic equipment.

The invention is not limited in any way to the embodiments described above, and it is obvious that the invention can be implemented in a variety of embodiments as long as they belong to the technical scope of the invention.

Figure 5:
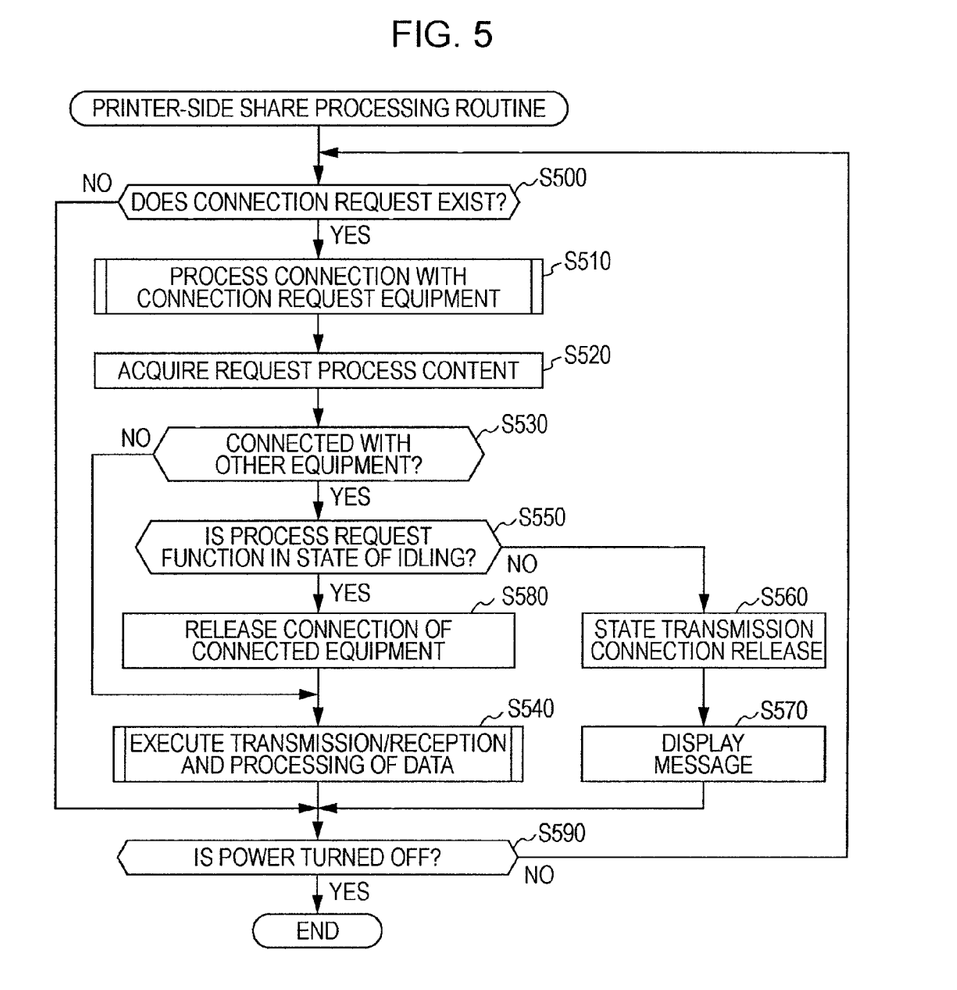
FIG. 5 is a flowchart showing an example of printer-side share processing routine.

For example, in the embodiment described above, the user PC 50 side determines whether the function of the printer 20 is in a state of idling, and transmits the command for releasing the wireless USB connection and the like. That is to say, the user PC 50 side controls the switching of the wireless USB connection. However, the printer 20 side may control the switching of the wireless USB connection. FIG. 5 is a flowchart illustrating an example of a printer-side share processing routine. This routine will be described below on the assumption that the routine is stored in the ROM 23 of the printer 20, and is executed using the USB controller 31 by the CPU 22 after the power of the printer 20 is turned on. Similarly to the embodiment described above, a case where the user PC 50 executes the print processing by the printing mechanism 25 as a data processing function of the printer 20 will be described by way of a specific example. When this routine is initiated, the CPU 22 determines whether the request of the wireless USB connection (connection request) exists (step S500). When the connection request exists, the CPU 22 executes the processing of the wireless USB connection with the corresponding electronic equipment (step S510). Similarly to the embodiment described above, at least one of the first transceiver 32 and the second transceiver 33 is opened, and the connection request from the equipment which is not connected by wireless USB is received via the transceiver which is opened. Next, the CPU 22 acquires the content of the request processing via the wireless USB connection with the electronic equipment (step S520), and determines whether the transceiver is connected with other equipment (step S530). When it is not connected with other equipment, the print processing is not being executed, therefore data are transmitted and received, and the print processing is executed (step S540). Meanwhile, when the transceiver is connected with other equipment in step S530, the CPU 22 determines whether the constituent (here, printing mechanism 25) for executing the function of the request processing content acquired in step S520 is in a state of idling (step S550). When this constituent is not in a state of idling, that is, when the data processing is being executed, the state thereof is transmitted to the electronic equipment (user PC 50) and at the same time the current connection state is released (step S560), and a message thereof is displayed on the display portion 27*a* (step S570). On the other hand, when the constituent for executing the function of the processing request content is in a state of idling in step S550, the equipment which is connected by wireless USB is considered not to be using the function of the printer 20, and the wireless USB connection of other equipment which is connected is released (step S580). With data being transmitted and received to and from the electronic equipment (user PC 50) which requested the connection in step S540, the print processing is executed. After step S540, or when the connection request does not exist in step S500, or after a message is displayed in step S570, the CPU 22 determines whether the power is turned off (step S590). When the power is not turned off, processes subsequent to step S500 are repeatedly executed, and when the power is turned off, this routine is terminated as it is. Even in doing so, since it is possible to prevent the equipment which is not executing the data processing from taking sole possession of the printing mechanism 25, with at least one transceiver of the switching wireless USB being opened, the throughput of data received from the electronic equipment can be increased as much as possible. In addition, when the first transceiver 32 side is connected by wireless USB for data communication, and the second transceiver 33 side is connected by wireless USB for switching of the connection destination, the first transceiver 32 side is disconnected and the second transceiver 33 side is used for data communication. On the other hand, when the second transceiver 33 is connected by wireless USB for data communication and the first transceiver 32 side is connected by wireless USB for switching of the connection destination, the second transceiver 33 side is disconnected and the first transceiver 32 side is used for data communication, therefore the number of disconnections is reduced as much as possible, to thereby allow the throughput of data received from the electronic equipment to be further increased.

In the embodiment described above, the first transceiver 32 and the second transceiver 33 have the same configurations. However, the first transceiver 32 may be specialized for transmission and reception of data on processing data, and the second transceiver 33 may be specialized for transmission and reception for switching of the electronic equipment. At this time, since the connection switching transceiver does not perform large-capacity communication, for example, it is possible to use the transceiver having low performance.

In the embodiment described above, although the connection is released in any case, there may be a connection with the printer 20 in a lock state where self-connection is not released by the connection request from other electronic equipment. In particular, for example, when the printer 20 receives a lock command for connecting with the printer 20 in a lock state where self-connection is not released by the connection request from other electronic equipment, the printer 20 may be connected with this electronic equipment in a lock state where the connection is not released by the connection request from other electronic equipment. With this configuration, it is possible to secure the sustained data processing.

In the embodiment described above, although the USB device 30 including two transceivers has been described, the USB device including three or more transceivers may be employed. In this case, one or more (so-called switching) transceivers in which the connection is not established, if at all possible, may be preferable to be employed.

In the embodiment described above, although descriptions have been made of the configurations in which a plurality of transceivers is included in the wireless USB device side to switch a plurality of wireless USB hosts, a plurality of transceivers may be included in the wireless USB host side to switch a plurality of wireless USB devices. For example, the printer 20 having the first transceiver 32 and the second transceiver 33 may be used as the USB host, and a plurality of digital cameras and the like may be used as the USB device, to thereby switch them.

In the embodiment described above, although description has been made of switching of the wireless USB connection on performing the print processing by the printing mechanism 25, the wireless USB connection on performing the image reading processing by the reading mechanism 26 may be switched, and the wireless USB connection on performing the data storage processing by the card reader 28 may be switched.

In the embodiment described above, although the printer 20 including the USB device 30 and the reading mechanism 26 has been described, the printer which does not include at least one or more of the reading mechanism 26 and the card reader 28 may be used, and a printing apparatus such as a FAX including the USB device 30 may be used. In addition, other electronic equipment, for example, a digital video or a game instrument and the like may be employed, without being limited to the printing apparatus. In the printer 20 described above, the ink jet type printing mechanism 25 is used. However, without being particularly limited to this, color dot impact type, color electrophotographic type, and color thermal transfer type printing mechanisms may be used, and monochrome types thereof may be used. In the embodiment described above, although the USB device 30 which the printer 20 includes has been described, the USB device 30 may be solely used, an embodiment of a method of controlling this printer 20 may be used, and an embodiment of a program thereof may be used.

What is claimed is:

1. An information processing device, comprising:
   a first wireless USB unit capable of wirelessly transmitting and receiving data;
   a second wireless USB unit capable of wirelessly transmitting and receiving data;
   a data processing unit that executes printing processing of data input from at least one of the first wireless USB unit and the second wireless USB unit; and
   a control unit, wherein
   when the first wireless USB unit is connected with a first external electronic equipment, the first wireless USB unit cannot process connection request initiated from a second external electronic equipment, and
   when the second wireless USB unit receives the connection request initiated from the second external electronic equipment and execution of printing processing requested by the second external electronic equipment while the first wireless USB unit is connected to the first external electronic equipment, the control unit:
   releases the connection with the first external electronic equipment when the printing processing is not executed with the first external electronic equipment;
   executes connection to the second external electronic device, wherein the connection to the second external electronic equipment is executed on the first wireless USB unit; and
   executes the printing processing with the second external electronic equipment after the connection to the second external electronic device is executed.

2. The information processing device according to claim 1, wherein the control unit transmits an execution state of the data processing unit to the second external electronic, and raises connection priority of the second external electronic equipment when a connection release command is received from the second external electronic equipment based on the connection priority.

3. The information processing device according to claim 1, wherein the data processing unit serves as one or more of a print processing unit that prints image data to a print medium, an image reading processing unit that reads a document medium to generate image data, and a data storage processing unit that stores data in a storage medium.

4. The information processing device according to claim 1, wherein when a lock command has been received at the time of the connection request from the second external electronic equipment, the control unit makes connection with the second external electronic equipment in a lock state such that the connection with the second external electronic equipment is not released by a connection request from other electronic equipment.

5. An information processing system, comprising:
the information processing device according to claim 2 capable of executing data processing; and
the second external electronic equipment including a transmission control unit that:
transmits the connection request to the information processing device at the time of executing data processing,
receives the execution state of the data processing unit from the information processing device, and
when the received execution state is a state where the data processing is not executed, transmits a command for raising self-connection priority and the connection release command for releasing the connection with the first external electronic equipment to the information processing device.

6. A method of controlling an information processing device including a first wireless USB unit capable of wirelessly transmitting and receiving data, a second wireless USB unit capable of wirelessly transmitting and receiving data, and a data processing unit that executes printing processing of data input from at least one of the first wireless USB unit and the second wireless USB unit, the method comprising:
when the first wireless USB unit is connected with a first external electronic equipment such that the first wireless USB unit cannot process connection request initiated from a second external electronic equipment:
receiving, by the second wireless USB unit, the connection request initiated from the second external electronic equipment and execution of printing processing requested by the second external electronic equipment while the first wireless USB unit is connected to the first external electronic equipment;
releasing the connection with the first external electronic equipment when the printing processing is not executed with the first external electronic equipment;
executing connection to the second external electronic device, wherein the connection to the second external electronic device is executed on the first wireless USB unit; and
executing the printing processing with the second external electronic equipment after the connection to the second external electronic device is executed.

7. An information processing device, comprising:
a first wireless communication unit capable of wirelessly transmitting and receiving data;
a second wireless communication unit capable of wirelessly transmitting and receiving data;
a data processing unit that executes printing processing of data input from at least one of the first wireless communication unit and the second wireless communication unit; and
a control unit, wherein
when the first wireless communication unit is connected with a first external electronic equipment, the first wireless communication unit cannot process connection request initiated from a second external electronic equipment, and
when the second wireless communication unit receives the connection request initiated from the second external electronic equipment and execution of printing processing requested by the second external electronic equipment while the first wireless communication unit is connected to the first external electronic equipment, the control unit:
releases the connection with the first external electronic equipment when the printing processing is not executed with the first external electronic equipment;
executes connection to the second external electronic device, wherein the connection of the second external electronic device is executed on the first wireless communication unit; and
executes the printing processing with the second external electronic equipment after the connection to the second external electronic device is executed.

8. The information processing device according to claim 7, wherein the first wireless communication unit is used only for transmission and reception of data for the data processing, and the second wireless communication unit is used only for transmission and reception of data for switching electronic equipment.

9. The information processing device according to claim 8, wherein when the first wireless communication unit is connected with the first external electronic equipment, and when the request for connection from the second external electronic equipment is received on the second wireless communication unit, the second external electronic equipment connects to the first wireless communication unit after the connection with the first external electronic equipment is released.

10. The information processing device according to claim 7, wherein the first wireless communication unit is specialized for transmission and reception of data for information processing, and the second wireless communication unit is specialized for switching connections to external electronic equipment.

11. The information processing device according to claim 7, wherein the first wireless communication unit has a higher performance data throughput transceiver than the second wireless communication unit.

* * * * *